May 15, 1962 — W. D. BRAND ET AL — 3,034,634
CONVEYOR SYSTEM
Filed Feb. 15, 1960 — 2 Sheets-Sheet 1

Inventors
Harold D. Montgomery
William D. Brand
By H R Rather
Attorney

United States Patent Office 3,034,634
Patented May 15, 1962

3,034,634
CONVEYOR SYSTEM
William D. Brand, Wauwatosa, and Harold S. Montgomery, Milwaukee, Wis., assignors to Cutler-Hammer, Inc., Milwaukee, Wis., a corporation of Delaware
Filed Feb. 15, 1960, Ser. No. 8,628
13 Claims. (Cl. 198—38)

This invention relates to conveyor systems and more particularly to coded card controlled systems for controlling the routing of articles or article carriers being conveyed along a conveyor to predetermined destinations.

While not limited thereto, the invention is especially applicable to roller or belt type conveyors for diverting article carriers at preselected points along the conveyor under the control of coded cards carried by such article carriers.

An object of the invention is to provide an improved control system for a conveyor.

Another object of the invention is to provide an improved coded card controlled system which is simple and economical in construction and efficient and reliable in operation.

A more specific object of the invention is to provide an improved electrical system for controlling a diverter or stop or the like whereby to divert article carriers from a main conveyor to branch conveyors in accordance with preselected codes.

Other objects and advantages of the invention will hereinafter appear.

While the apparatus hereinafter described is effectively adapted to fulfill the objects stated, we do not intend to confine our invention to the particular preferred embodiment of control system disclosed, inasmuch, as it is susceptible of various modifications without departing from the appended claims.

The invention will now be described in detail with reference to the accompanying drawings, wherein.

Figure 1:
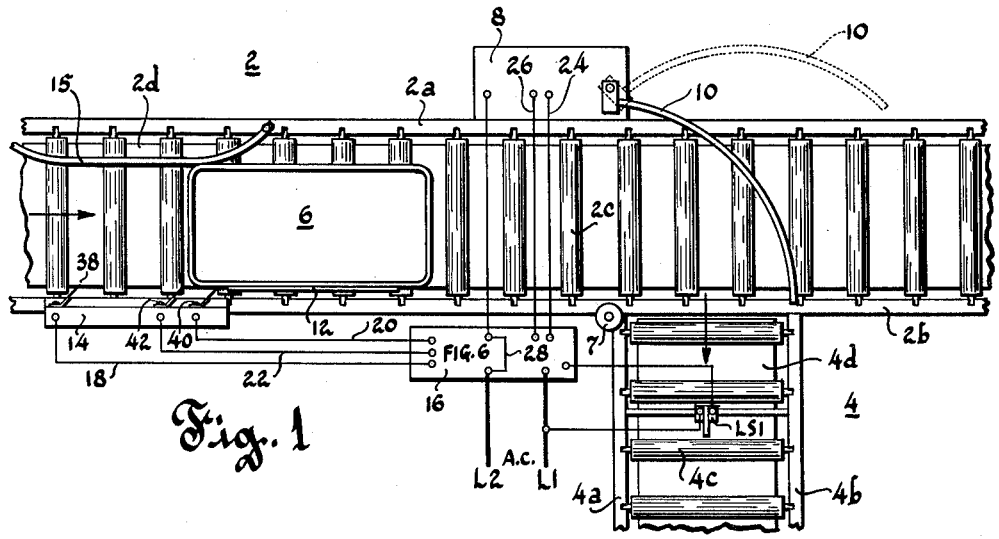
FIGURE 1 is a top view of an article conveyor and diverter system constructed in accordance with the invention.

Referring to FIG. 1, there is shown an article conveyor comprising a main conveyor 2 and a branch conveyor 4, the latter extending from the lower side of the main conveyor at a right angle. While branch conveyor 4 has been shown for exemplary purposes as disposed at a right angle to the main conveyor, it will be apparent that the same could as well be arranged adjacent to and parallel with the main conveyor.

The conveyors are of the well known belt driven roller type and are adapted for conveying an article or article carrier such as, for example, a tray 6 or the like. Main conveyor 2 is provided with a pair of generally shallow U-shaped support or frame members 2a and 2b arranged on edge with the bottoms of the U-shaped members arranged in opposed relation to form side rails for the conveyor. The upper, inner corners of frame members 2a and 2b are provided with equally spaced notches, each notch on member 2a being in lateral alinement with a corresponding notch on member 2b and each such pair of alined notches being adapted to accommodate and securely support the ends of the axle of a conveyor roller 2c. The ends of the roller axle may be of hexagonal cross section or may be provided with suitable flat or partially flat sides to be held against rotation in their associated notches, whereas roller 2c is mounted for free rotation on the axle. Rollers 2c are frictionally driven by an endless motor-driven belt 2d. In conveyors of this type, a row of idler rollers, not shown, are mounted below belt 2d and these idler rollers are staggered relative to rollers 2d to bias belt 2d into frictional engagement with rollers 2d.

Similarly, branch conveyor 4 is provided with a pair of like, spaced frame members 4a and 4b, each having notches for receiving the ends of the axles of a plurality of spaced rollers 4c. These rollers are frictionally driven by an endless motor-driven belt 4d and a row of freely rotatable idler rollers, not shown, are mounted in a suitable manner below belt 4d for biasing the belt into frictional engagement with rollers 4d. A freely rotatable guidewheel 7 is journaled on the end of frame member 4a for guiding tray 6 as it turns from the main conveyor to the branch conveyor.

As shown in FIG. 1, a diverting mechanism having a supporting housing 8 and a diverting arm 10 is mounted on main conveyor 2 on the side thereof opposite from the branch conveyor and immediately adjacent the entry side of branch conveyor 4. As will be apparent, the diverter mechanism may be mounted at any point along the main conveyor if the branch conveyor is disposed adjacent to and parallel with the main conveyor. Diverting arm 10 is suitably curved toward the main conveyor to facilitate turning of tray 6 as the latter engages the arm. Diverting arm 10 is pivotally supported at one end thereof on housing 8 and is operable from a non-diverting position shown in dotted lines wherein such arm is clear of the articles traveling along the main conveyor to a diverting position over the main conveyor as shown in solid lines. The electric motor hereinafter described and the motor-operated mechanism for rotating arm 10 is mounted in housing 8. This mechanism has not been shown in detail herein to avoid complicating the drawings. For a more detailed disclosure of such mechanism, reference may be had to Carl J. Weiss copending application Serial No. 4,419 filed January 25, 1960, now Patent No. 3,006,457 dated October 31, 1961.

The control system for operating the motor of diverting mechanism 8 comprises a coded card 12 removably held in a slot in the side of tray 6 and a contact finger device 14 mounted on the side of main conveyor 2 ahead of the diverting mechanism. A guide member 15 is mounted on conveyor 2 directly opposite contact finger device 14 to guide the tray so that card 12 engages the contact fingers. Contact finger device 14 is connected to a transistorized relay motor control circuit 16 through conductors 18, 20 and 22, this circuit being shown in detail in FIG. 6. As shown in FIG. 1, circuit 16 is energized from an A.-C. source through power supply lines L1 and L2 and is connected to a limit switch LS1 which is mounted between the second and third rollers of the branch conveyor. Circuit 16 is also connected to the motor of diverting mechanism 8 through conductors 24, 26 and 28 as hereinafter more fully described in connection with FIG. 6.

Figure 2:
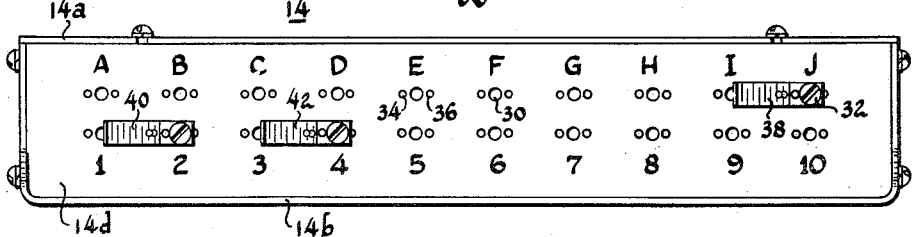
FIG. 2 is a front elevation view of a contact finger device employed in the system of FIG. 1.
Figure 3:
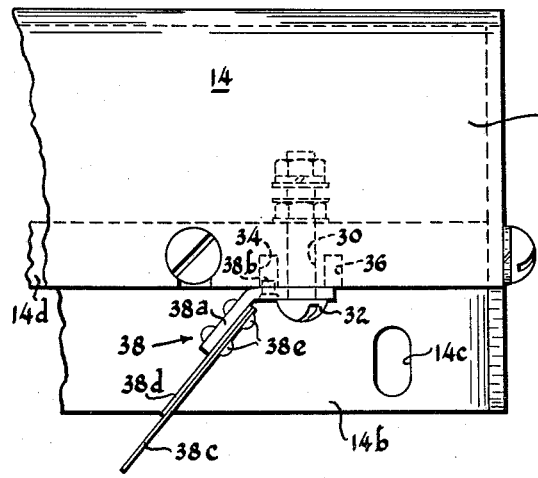
FIG. 3 is a fragmentary enlarged top view of the contact finger device of FIG. 2.

As shown in FIGS. 2 and 3, contact finger device 14 comprises a housing 14a having a forwardly extending lower portion 14b, the latter being provided with elongated holes 14c for adjustably securing the same to frame member 2b of the main conveyor by suitable bolts or the like. The front face of housing 14a is comprised of an insulating plate 14d having substantial thickness and rigidity. Plate 14d is provided with sets of holes arranged in a plurality of rows, for example, two horizontal rows, the sets of holes of the upper row being marked A through J and the sets of holes of the lower row being numbered 1 through 10. Each such set of holes comprises a relatively large center hole 30 extending through plate 14d for accommodating a contact finger securing bolt 32 and a pair of relatively smaller holes 34 and 36, one on each side of hole 30 and spaced horizontally therefrom and extending partially into plate 14d. As shown in FIGS. 1 and 2, a plurality of contact fingers, for example, three fingers 38, 40 and 42 are secured to the aforementioned holes in plate 14d in selected positions and extend at an acute angle from plate 14d over the main conveyor.

Contact finger 38, as shown in FIG. 3, comprises a rigid supporting member 38a bent at its midportion at an obtuse angle. One angular portion is provided with a hole for accommodating bolt 32 and a projection 38b positioned in hole 34 to lock the contact finger in its position. An elongated contact finger strap 38c and a reinforcing leaf spring 38d are rigidly secured at one end thereof to the other angular portion of member 38a by a pair of rivets 38e or the like, spring 38d extending partway along strap 38c and being between the latter and member 38a at the riveted end. It will be apparent that contact fingers 38, 40 and 42 are reversible by loosening bolt 32, rotating member 38a to a position wherein projection 38b enters hole 36 and retightening the bolt. This reversible feature permits mounting of the contact finger device on either side of the conveyor or permits engagement of coded card 12 regardless of the direction in which tray 6 travels when mounted on one side of the conveyor.

Figure 5:
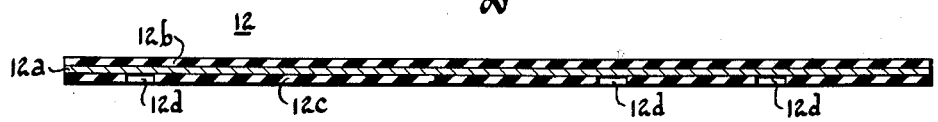
FIG. 5 is a cross sectional view taken along line 5—5 of FIG. 4.
Figure 4:
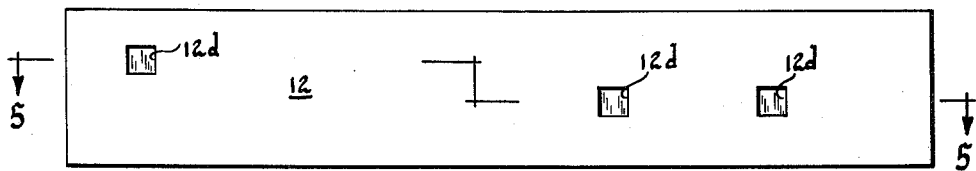
FIG. 4 is a front elevation view of a coded card employed in the system of FIG. 1.

As shown in FIGS. 4 and 5, coded card 12 consists of a rectangular member having three laminations, an electrically conductive lamination 12a in the middle and electrically insulating laminations 12b and 12c on opposite faces thereof. Conductive lamination 12a may be of metallic material such as aluminum sheet or the like. Insulating laminations 12b and 12c may be of plastic material bonded to the aluminum sheet. A predetermined code is registered on card 12 by cutting away portions of insulating layer 12c to leave conducting layer 12a exposed at portions 12d, these exposed portions corresponding to the contact finger positions of device 14 at a selected reading station along the conveyor.

Figure 6:
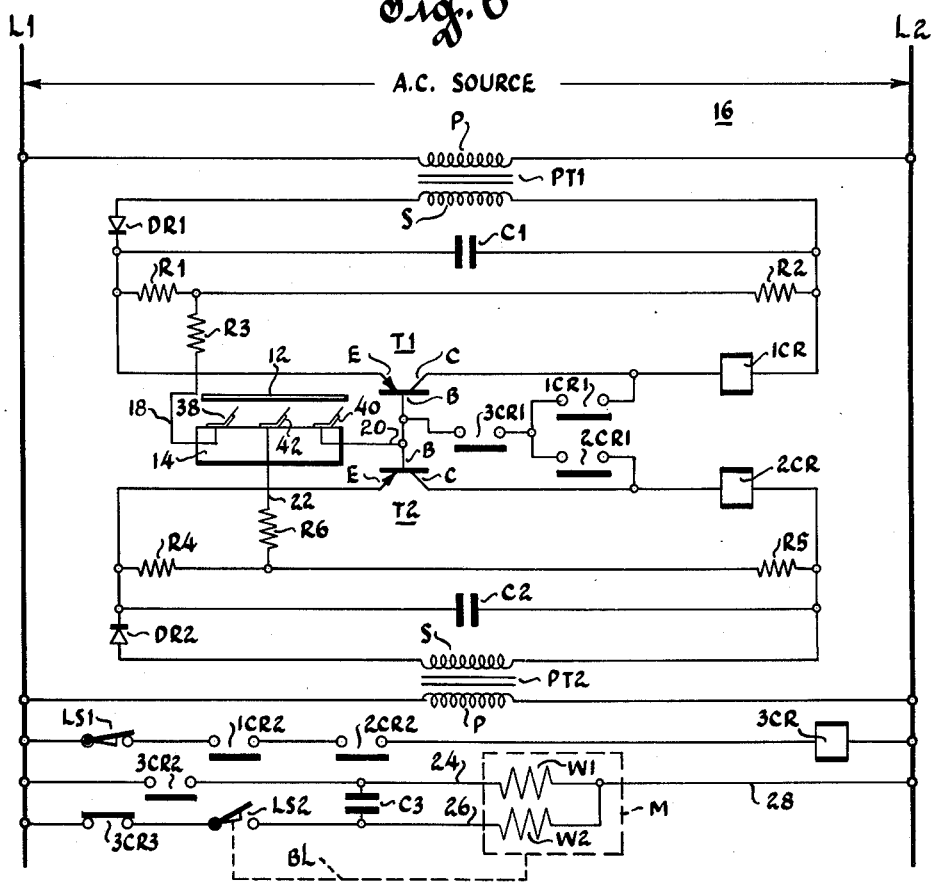
FIG. 6 is a diagrammatic illustration of a transistorized control circuit for the system of FIG. 1.

Referring to FIG. 6, there is shown a control circuit 16 for the diverter system. The control circuit is connectable through power supply lines L1 and L2 to an alternating current power supply source. The primary primary windings P of a pair of transformers PT1 and PT2 are connected in parallel across lines L1 and L2.

The left-hand side of secondary windings S of transformer PT1 is connected through a half-wave rectifier DR1, emitter electrode E and collector electrode C of a controlled semi-conductor device T1 and the operating coil of a control relay 1CR in series to the right-hand side of secondary winding S of transformer PT1. A smoothing capacitor C1 is connected across rectifier DR1 and secondary winding S. A voltage divider comprising series-connected resistors R1 and R2 is connected across rectifier DR1 and secondary winding S. The junction between resistors R1 and R2 is connected through a resistor R3 and conductor 18 to the aforementioned contact finger 38.

Similarly, the left-hand side of secondary winding S of transformer PT2 is connected through a half-wave rectifier DR2, emitter electrode E and collector electrode C of a controlled semi-conductor device T2 and the operating coil of a control relay 2CR in series to the right-hand side of secondary winding S of transformer PT2. A smoothing capacitor C2 is connected across rectifier DR2 and secondary winding S. A voltage divider comprising resistors R4 and R5 is connected across rectifier DR2 and secondary winding S. The junction between resistors R4 and R5 is connected through a resistor R6 and conductor 22 to the aforementioned contact finger 42.

Semi-conductor devices T1 and T2 are illustrated as being transistors of the P-N-P conductivity type or the like each having an emitter electrode E, a collector electrode C and a base electrode B. Base electrodes B of transistors T1 and T2 are connected directly to one another and through conductor 20 to the aforementioned contact finger 40. Base electrodes B are also connected through a normally open contact 3CR1 of a control relay 3CR and a normally open contact 1CR1 of control relay 1CR to the junction between collector electrode C of transistor T1 and the operating coil of relay 1CR. Base electrodes B are further connected through such contact 3CR1 and a normally open contact 2CR1 of control relay 2CR to the junction between collector electrode C of transistor T2 and the operating coil of relay 2CR. The operating coil of control relay 3CR is connected through normally open contacts 1CR2 and 2CR2 and a normally closed limit switch LS1 across lines L1 and L2.

Motor M which operates the aforementioned diverting arm 10 shown in FIG. 1 is an alternating current motor of the single-phase type. Motor M is of the reversible type and is provided with a pair of operating windings W1 and W2. Motor M is constructed so that it can be stalled indefinitely without damage to the windings as by overheating. Windings W1 and W2 of the motor are connectable in parallel across lines L1 and L2, and when so connected, one of the windings is phase-displaced relative to the other winding. To this end, winding W1 is connected through conductors 24 and 28 and normally open contact 3CR2 across lines L1 and L2 for forward rotation. Winding W2 is connected through conductors 26 and 28, normally closed contact 3CR3 and a normally open limit switch LS2 across lines L1 and L2 for reverse rotation. A phase-shifting capacitor C3 is connected betwen conductors 24 and 26. As indicated by broken line BL, limit switch LS2 is operated by motor M and closes when the diverting arm is moved from its non-diverting position toward its diverting position and reopens to stop the motor when the diverting arm is returned to its non-diverting position.

The operation of the system will now be described, reference being made to FIGS. 1 and 6. When tray 6 reaches a reading station such that the punched code on card 12 matches the contact fingers on device 14, the center conductive layer of card 12 becomes effective to bridge contact fingers 38, 40 and 42. As a result, a positive bias voltage corresponding to the voltage drop across resistor R1 is applied across the emitter and base electrodes of transistor T1. This circuit may be traced from the left-hand positive end of resistor R1 to emitter E and from the right-hand relatively negative end of resistor R1 through resistor R3, conductor 18, contact finger 38, card 12, contact finger 40 and conductor 20 to base B of transistor T1. Such bias voltage renders transistor T1 conducting in a circuit extending from the left-hand side of secondary winding S of transformer PT1 through rectifier DR1, emitter E and collector C of transistor T1 and the operating coil of relay 1CR to the right-hand side of secondary winding S to energize relay 1CR and close contacts 1CR1 and 1CR2.

Similarly, a positive bias voltage corresponding to the voltage drop across resistor R4 is applied across the emitter and base electrodes of transistor T2. This circuit may be traced from the positive left-hand end of resistor R4 to emitter E and from the relatively negative right-hand end of resistor R4 through resistor R6, conductor 22, contact finger 42, card 12, contact finger 38 and conductor 18 to base B of transistor T2. The function of resistor R3 and resistor R6 in the bias circuits of transistors T1 and T2 respectively, is to limit the emitter to base currents. As a result, transistor T2 is rendered conducting in a circuit extending from the left-hand side of secondary winding S of transformer PT2 through rectifier DR2, emitter E and collector C of transistor T2 and the operating coil of relay 2CR to the right-hand side of secondary winding S to energize relay 2CR and close contacts 2CR1 and 2CR2.

Closure of contacts 1CR1 and 2CR1 as aforementioned completes respective points in maintaining circuits for relays 1CR and 2CR. Closure of contacts 1CR2 and 2CR2 completes an energizing circuit for the operating coil of relay 3CR across lines L1 and L2 through limit switch LS1. As a result, contact 3CR1 completes the aforementioned maintaining circuits for relays 1CR and 2CR from rectifier DR1 through emitter E and base B of transistor T1 and contact 1CR1 and from rectifier DR2 through emitter E and base B of transistor T2 and contact 2CR1.

These maintaining circuits are required to maintain transistors T1 and T2 conducting and relays 1CR and 2CR energized after tray 6 passes beyond the reading station and contact fingers 38 and 40 and 38 and 42, respectively, are unbridged by card 12. As will be apparent, the circuit through contacts 1CR1 and 3CR1 maintains a positive emitter to base bias voltage on transistor T1 and the circuit through contacts 2CR1 and 3CR1 maintains a positive emitter to base bias voltage on transistor T2, these maintaining bias voltages being limited by the respective voltage drops in the operating coils of relays 1CR and 2CR.

Closure of contact 3CR2 completes an energizing circuit for motor M to start the motor in the forward direction. As will be apparent, winding W1 is energized directly across lines L1 and L2 and winding W2 is energized in parallel therewith through phase-shifting capacitor C3. Contact 3CR3 opens to interrupt the reversing circuit of motor M. Operation of motor M in the forward direction causes movement of diverting arm 10 into its diverting position. As arm 10 leaves its non-diverting position shown in dotted lines in FIG. 1, limit switch LS2 closes to complete a point in the reversing circuit of motor M. Thus, the tray carrying card 12 which initiated the aforementioned operations is diverted onto branch conveyor 4. As the tray is turned onto branch conveyor 4 sufficiently to be driven by rollers 4C, the bottom thereof engages limit switch LS1 to open the latter. As a result, relay 3CR is deenergized and contact 3CR1 opens to interrupt the maintaining circuits of transistors T1 and T2 to render the latter non-conducting thereby to deenergize relays 1CR and 2CR. Contact 3CR2 interrupts the forward energizing circuit of motor M. Contact 3CR3 closes to complete a reverse energizing circuit for motor M. As will be apparent, winding M2 is energized directly across lines L1 and L2 through limit switch LS2 and winding W1 is energized in parallel therewith through phase-shifting capacitor C3. Operation of motor M in the reverse direction causes movement of diverting arm 10 back to its non-diverting position. When tray 6 passes over and beyond and disengages limit switch LS1, the latter recloses. Also, deenergization of relays 1CR and 2CR effects reopening of contacts 1CR1, 1CR2, 2CR1, and 2CR2. When arm 10 reaches its non-diverting position, limit switch LS2 reopens to stop the motor.

While the system has been illustrated as being employed to operate a diverter motor, it will be apparent that it could as well be employed to operate other devices such as tray stops or the like for spacing trays along the conveyor.

We claim:

1. In a control system for a conveyor operable to convey articles therealong, a diverter station on the conveyor, said diverter station comprising means for diverting an article from the conveyor and a code reader, said reader comprising a plurality of contact members mounted on the conveyor, said contact members being arranged in accordance with a predetermined code, a coded card carried by said article for engagement by said contact members as said article approaches said diverting means, said coded card being effective electrically to connect said contact members when the code on said card corresponds to the code of said contact members, and means responsive to connection of said contact members for operating said diverting means from its normal non-diverting position to its diverting position comprising a power supply source, electroresponsive means for operating said diverting means, and semi-conductor control means operable in response to connection of said contact members for energizing said electroresponsive means, said code reader further comprising a supporting member secured to a side of the conveyor, a mounting plate secured to said supporting member, said mounting plate having a multiplicity of holes therethrough arranged in horizontal rows, and a plurality of contact members mounted in selected ones of said holes forming a reader code.

2. The invention defined in claim 1, wherein said supporting member is provided with elongated apertures affording securing of and adjustment of said code reader transversely of the conveyor so that said contact members extend partially into the path of the article traveling along the conveyor.

3. The invention defined in claim 1, wherein each of said contract members comprises a shank member bent at an obtuse angle, one obtuse angular portion of said shank member being secured to said mounting plate through one of said holes therein, the other obtuse angular portion of said shank member extending at an acute horizontal angle from said mounting plate, and a resilient contact finger having one end rigidly secured to said other angular portion.

4. The invention defined in claim 3, wherein said one obtuse angular portion is provided with a lateral projection, pairs of cavities in said mounting plate with one of said cavities of each pair spaced horizontally on each side of each said hole, said lateral projection extending into said first one of said cavities to lock said contact member in its position, and said second cavity being provided to receive said lateral projection to lock said contact member when the latter is reversed.

5. The invention defined in claim 3, wherein said contact member is further provided with a stiffening member having one end thereof rigidly secured between said contact finger and said other angular portion of said shank member, said stiffening member being contiguous to and extending part way along said contact finger.

6. In a control system for an article diverter operable to divert articles being conveyed along a conveyor and having operating means and a code reader for reading coded cards carried by the articles as they approach the diverter, the improvement comprising a plurality of electrical contact members arranged on the code reader according to a predetermined code, said contact members being arranged to be electrically connected by the card when the code on a given card corresponds to the code arrangement of said contact members, a plurality of transistor controlled relay circuits, one of said contact members being connected in common to the transistor of each said circuit and others of said contact members being connectable to supply control voltage to respective transistors thereof, each said transistor being effective to energize its associated relay when its associated one of said other contact members is connected to said common contact member, and means responsive to concurrent energization of said relays for operating the operating means in one direction to cause diverting of the article carrying said given card.

7. The invention defined in claim 6, together with means adapted to be actuated by the article for operating the operating means in the reverse direction to render the diverter ineffective.

8. In a control system for a conveyor operable to convey article carriers therealong, a diverter station on the conveyor, said diverter station comprising means for diverting an article carrier from the conveyor and a reader, said reader comprising a plurality of contact members mounted on the conveyor, said contact members being arranged in accordance with a predetermined code, a coded card carried by said article carrier for engagement by said contact members as said article carrier approaches said diverting means, said coded card comprising an electrically conductive member having an electrically insulating layer thereon, said insulating layer having portions removed therefrom to expose said conductive member in accordance with a predetermined code and said conductive member being effective electrically to connect said contact members when the code on said card matches the code of said contact members, and means responsive to connection of said contact members for operating said diverting means from its normal non-diverting position to its diverting position comprising a power supply source, electroresponsive means for operating said diverting means, semi-conductor control means operable in response to connection of said contact members for energizing said electroresponsive means, and limit switch means operable by said article carrier following diversion thereof for deenergizing said semiconductor control means and said electroresponsive means.

9. In a control system for a main conveyor operable to convey article carriers therealong, a diverter station on the main conveyor for diverting one or more article carriers therefrom onto a branch conveyor, said diverter station comprising means for diverting an article carrier from the main conveyor and a code reader, said reader comprising at least three contact members mounted on the main conveyor, said contact members being physically arranged according to a predetermined code, a code card removably carried by each article carrier for momentary engagement by said contact members as said article carriers approach said diverting means, said coded card being effective electrically to connect pairs of said contact members when the code on said card corresponds to the code of said contact members, and means responsive to connection of said pairs of contact members for actuating said diverting means from its normal non-diverting position to its diverting position comprising a power supply source, motive power means connectable to said source for actuating said diverting means, first and second transistor controlled circuits for energizing respective relays, means responsive to momentary connection of the first and second contact members for rendering said first transistor conducting to energize the first relay, means responsive to momentary connection of the first and third contact members for rendering said second transistor conducting to energize the second relay, and control means responsive to concurrent momentary energization of said first and second relays for energizing said motive power means to actuate said diverting means to its diverting position.

10. In a control system for a main conveyor operable to convey articles therealong, a diverter station on the main conveyor for diverting one or more articles therefrom onto another conveyor, said diverter station comprising means for diverting an article from the main conveyor and a code reader, said reader comprising a plurality of contact members mounted on the main conveyor, said contact members being arranged in accordance with a predetermined code, a coded card carried by each article for momentary engagement by said contact members as said articles approach said diverting means, said coded card being effective electrically to connect said contact members when the code on said card corresponds to the code of said contact members, and means responsive to connection of said contact members for actuating said diverting means from its normal non-diverting position to its diverting position comprising a power supply source, reversible motive power means connectable to said source for actuating said diverting means, a pair of transistors each having emitter and collector and base electrodes, a pair of control relays, the operating coil of each said control relay being connected in series with the emitter and collector electrodes of one of said transistors to said source, means comprising a first pair of said contact members responsive to momentary bridging thereof by said coded card for connecting a control voltage across the emitter and base electrodes of a first one of said transistors to render the latter conducting and to energize the associated relay, means comprising a second pair of said contact members responsive to momentary bridging thereof by said coded card for connecting a control voltage across the emitter and base electrodes of the second transistor to render the latter conducting and to energize the associated relay, and control means operable in response to concurrent energization of both said relays for operating said motive power means to actuate said diverting means to its diverting position.

11. The invention defined in claim 10, together with a first limit switch responsive to actuation of said diverting means to its diverting position for partially completing a reversing circuit for said motive power means, a second limit switch adopted to be actuated by the diverted article to cause restoration of said control means, and means responsive to restoration of said control means for reversely energizing said motive power means to reactuate said diverting means to its non-diverting position, reactuation of said diverting means to its non-diverting position causing reopening of said first limit switch to deenergize said motive power means.

12. The invention defined in claim 10, together with means responsive to operation of said control means for establishing maintaining circuits to maintain said relays energized following disconnection of said contact members when the article carrying said coded card passes beyond said code reader.

13. The invention defined in claim 10, together with means responsive to operation of said control means for establishing maintaining circuits for said first and second transistors to maintain the latter conducting thereby to maintain said relays energized following disconnection of said contact members when the article carrying said coded card passes beyond said code reader.

References Cited in the file of this patent

UNITED STATES PATENTS

| | | |
|---|---|---|
| 1,934,377 | Robbins | Nov. 7, 1933 |
| 1,983,342 | Chambers | Dec. 4, 1934 |
| 2,063,230 | Crady | Dec. 8, 1936 |
| 2,794,535 | Hauschild | June 4, 1957 |